United States Patent Office

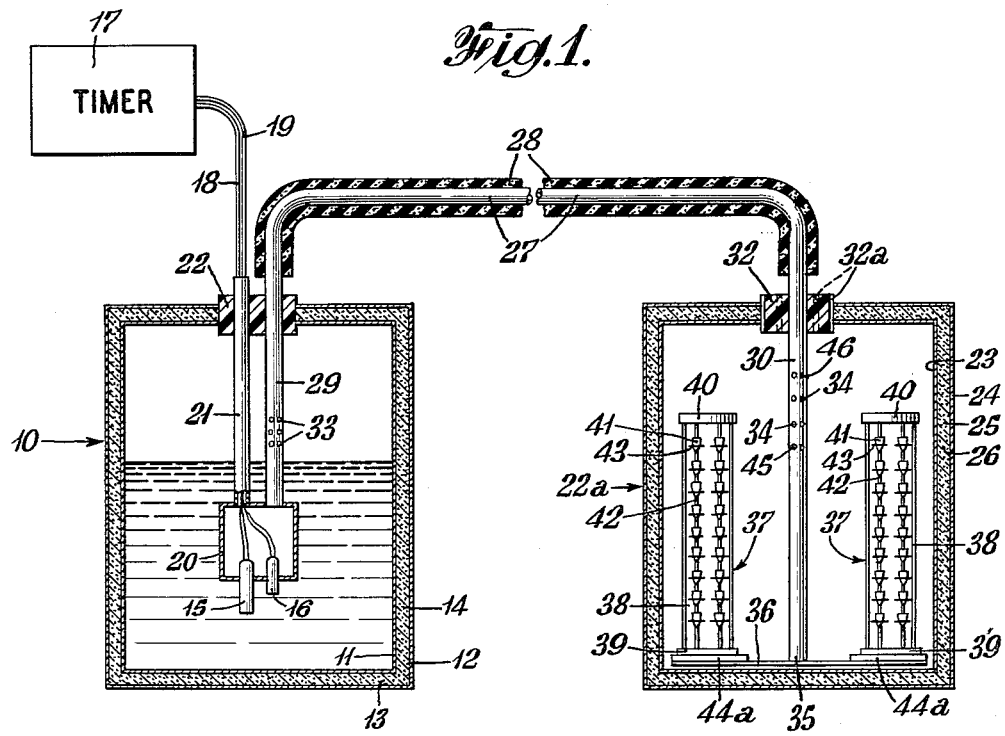
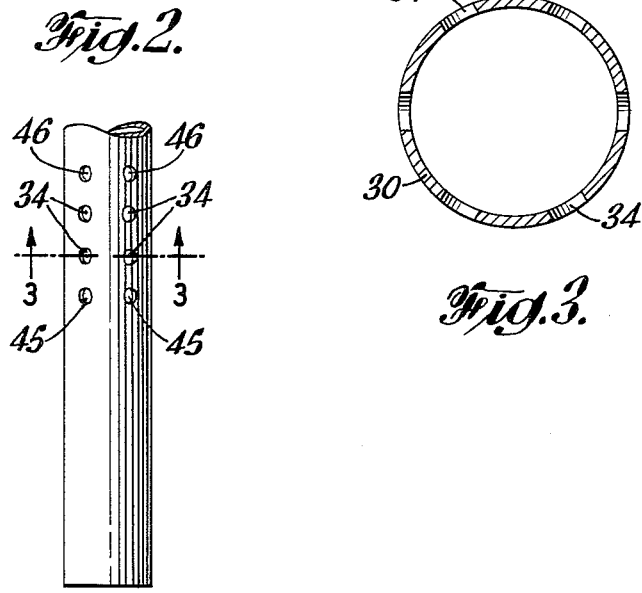
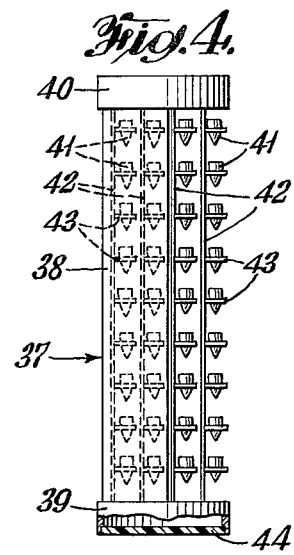
INVENTORS
WILFRIED HAUMANN
DOGAN A. ESERCE
BY William H. Mesinger
ATTORNEY

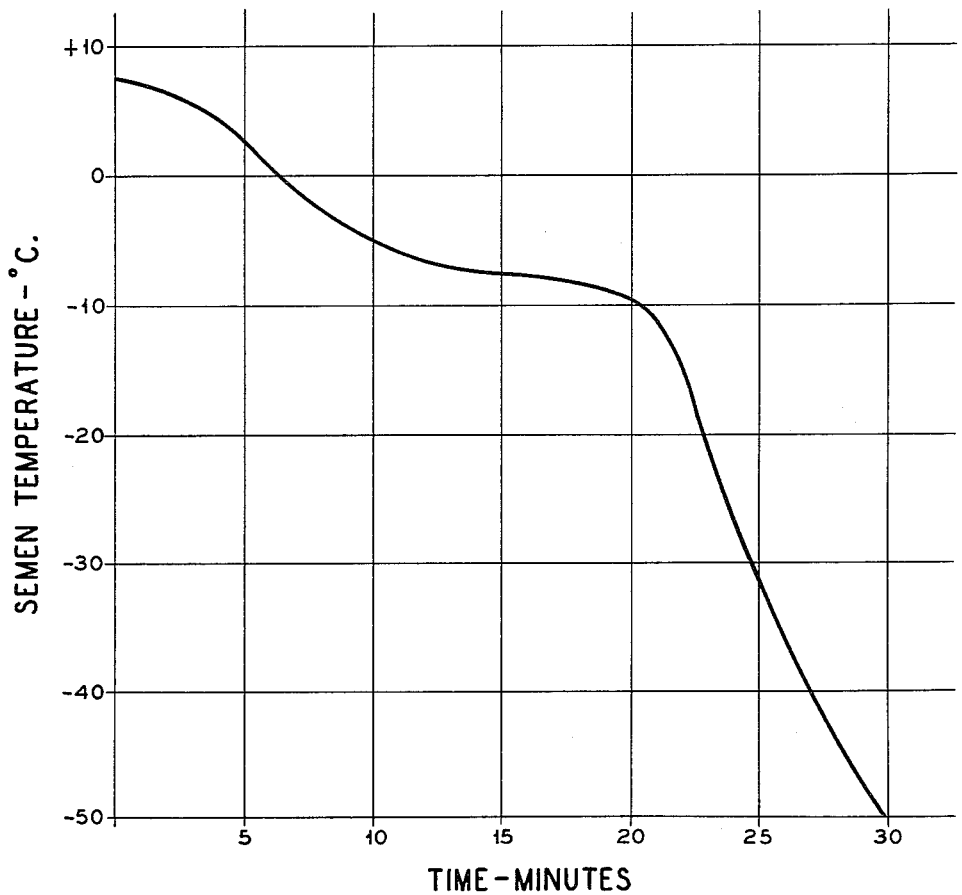

3,092,974
Patented June 11, 1963

3,092,974
METHOD AND APPARATUS FOR CONTROLLED FREEZING OF BIOLOGICALS
Wilfried Haumann and Dogan A. Eserce, Indianapolis, Ind., assignors to Union Carbide Corporation, a corporation of New York
Filed July 21, 1960, Ser. No. 44,397
20 Claims. (Cl. 62—62)

This invention relates to a method of and apparatus for controlled cooling and freezing of biological substances, and more specifically for controlled cooling and freezing of biological substances such as bovine semen with minimum loss of vitality.

At present there is considerable commercial activity in the storage of biological substances such as bovine semen at low temperatures. The presently employed refrigerated storage containers use either liquid nitrogen or a solid carbon dioxide-alcohol slurry mixture, the former being preferred since its boiling point is sufficiently low to insure that the storage bath will be safely below the critical temperature range of the biologicals. Regardless of which type of refrigerant is used, it has been found that many varieties of biologicals cannot be immediately subjected to the colder temperature of the refrigerant, for example, liquid nitrogen at −196° C. That is, the temperature of the semen must be reduced at a slower rate in order to preserve its vitality. For bovine semen the optimum cooling rate has been found to be 1° C.–2° C. per minute from +5° C. to −15° C., and 3–5° C. per minute until a temperature of −50° C. is obtained. It has also been discovered that as long as the bovine semen is not immediately subjected to the colder temperature of the refrigerant, the cooling rate is not critical prior to reaching a temperature of +5° C.

For many years the principal method of freezing biologicals at a desired cooling rate has been an alcohol bath into which the semen ampules are immersed. Solid or liquid carbon dioxide is then added to lower the temperature of the alcohol bath. By use of a suitable controller the carbon dioxide is added at an appropriate rate until the semen reaches a temperature of −50° C. The frozen semen ampules are then transferred to a refrigerated storage container for their ultimate use.

Although the desired cooling rate was obtainable by this method, there are several important disadvantages and limitations to this prior art system. One critical problem is the flammability of the alcohol. Another disadvantage is that the rack assemblies or canisters that house the ampules become wet with alcohol, so that when they are removed from the refrigerator and placed into the colder storage container, the alcohol will freeze causing the parts of the containers to freeze together and to the ampules. As a result there is a delay in transferring the semen from the refrigerator to the storage container, which delay is necessary to allow for the various parts to dry. The delay not only created inefficiencies but also produced a temperature rise which tended to decrease the vitality of the semen after it had once been frozen.

A principal object of the present invention is to provide an improved system for controlled cooling and freezing of biological substances.

Another object is to provide an improved method of and apparatus for cooling and freezing bovine semen.

Still another object is to provide an improved method of and apparatus for cooling and freezing bovine semen which permits cooling, freezing and storage without transfer from one container to another.

A further object is to provide an improved method of and apparatus for cooling and freezing of biological substances which does not involve the use of alcohol or other inflammable fluid, thereby eliminating a serious safety hazard.

Other objects and advantages of the present invention will be apparent from the ensuing disclosure and appended claims.

In the drawings,
FIG. 1 is a cross-section view with parts in elevation of apparatus according to the present invention;
FIG. 2 is a fragmentary vertical elevational view on an enlarged scale of the conduit end section which is received in the biological substance storage container;
FIG. 3 is a sectional view of the same conduit end section taken along line 3—3 of FIG. 2;
FIG. 4 is an enlarged vertical elevational view of a suitable ampule holding canister for insertion in the biological substance storage container of FIG. 1; and
FIG. 5 is a graph showing the desired cooling rate for bovine semen.

The aforementioned objects are accomplished by providing the biological substance in a first storage zone. A second zone is physically separate from the first storage zone and contains a body of liquefied gas having a boiling point below about −183° C. at atmospheric pressure. The second zone is heated at a controlled rate sufficient to vaporize a portion of the liquefied gas body, and the resulting vapor is passed to the first storage zone so as to cool and freeze the biological substance. After freezing the biological substance, the first storage zone is filled with the low boiling liquefied gas.

In a preferred embodiment, the liquefied gas is nitrogen, the biological substance is bovine semen, and the second zone is heated at an adjustably controlled rate. Although the invention will be specifically described in terms of freezing bovine semen, it is equally suitable for cooling and freezing of other biological substances such as sheep semen and swine semen.

The apparatus form of this invention contemplates a first container for storing the biological substance and a second liquefied gas storage container. Means are provided for controllably heating the liquefied gas, and for transferring the vapors of the liquefied gas from the second container to the first container to cool and freeze the biological substance stored therein. The vapor transfer means is preferably a conduit having opposite end portions enclosed respectively in the first and second containers. The extremities of the conduit are closed and the end portions are provided with longitudinally spaced apertures for passage of the vaporized portion into the conduit from the second container and discharge therefrom to the first container.

As the means for controllably heating the liquefied gas, at least two electrical heaters are preferably immersed in the liquefied gas and an adjustable timer is arranged and constructed for separately and jointly operating the heaters for variable periods.

Referring now more specifically to the drawings and FIG. 1, a container 10 is provided and stores a body of liquefied gas having a boiling point below about −183° C. at atmospheric pressure. Liquid nitrogen is the preferred liquefied gas, due to its low boiling point and relative inertness. However, other liquefied gases such as oxygen, argon and helium could be employed instead. The container 10 may be of any suitable construction, however a double walled, powder-in-vacuum insulated container is preferred from the standpoint of reduced heat inleak. Accordingly, liquefied gas container 10 comprises inner vessel 11 surrounded by outer casing 12 with an intervening space 13 under a vacuum pressure and filled with a suitable insulating material 14 such as perlite powder.

Suitable means for controllably heating the liquefied gas in container 10 are provided and preferably comprise electrically operated heating coils 15 and 16 immersed in the liquid. Both heaters are electrically connected to a suitable timer or controller 17 by means of wires 18 and 19, respectively. It is to be understood that timer 17 also includes a suitable power source. The heaters 15 and 16 are suspended in the container 10 through openings in the lower end of chamber 20, fluid-seals being provided between the heaters and the chamber opening walls. The electrical connections are enclosed in fluid-tight chamber 20 and communicating conduit 21 for protection against contact with the liquefied gas refrigerant and possible short circuits. The outer end of conduit 21 extends through low heat conductive plug 22 over an opening in the upper end of liquefied gas container 10.

Controller 17 includes means for separately and jointly operating heaters 15 and 16 for variable succeeding periods in any desired sequence so as to provide an optimum cooling and freezing pattern for the particular biological substance being treated. That is, the optimum cooling and freezing pattern for bovine semen may not be the best program for swine semen, and the present invention permits the necessary adjustments to effect such an optimum program.

Another container 22a is provided for storing the bovine semen to be cooled and frozen, and may for example be of similar construction to liquefied gas container 10. In this event, container 22a may comprise inner vessel 23 surrounded by outer casing 24 having an evacuable space 25 therebetween which is filled with a suitable low conductive insulating material 26 such as the previously mentioned perlite, an exploded volcanic glass. Again highly efficient insulation is advantageous to reduce the heat inleak and thereby recover substantially all of the refrigeration of the nitrogen vapor, as described later in detail.

Containers 10 and 22a are connected by vapor conduit 27 which is preferably thermally insulated by, for example, a layer 28 of foam rubber or foamed plastic. The opposite end portions 29 and 30 of conduit 27 are respectively enclosed in containers 10 and 22a. That is, end portion 29 extends through an opening in low thermally conductive plug 22, and end portion 30 extends through an opening in similar low thermally conductive plug 32 which in turn is supported by the upper end of bovine semen container 22a. Plug 32 preferably has longitudinal grooves or channels 32a spaced around the outer surfaces thereof for passage of warmed refrigerant vapors from the upper end of container 22a for release to the atmosphere. Alternatively, container 22a may be constructed to withstand internal pressures without continuous venting of warmed refrigerant vapors to the atmosphere. In this event suitable pressure releases means should be provided as is well understood by those skilled in the art.

The lower extremity of end portion 29 is sealed against and serves as a suspension means for chamber 20 housing the heater wiring. Also, end portion 29 is provided with longitudinally spaced apertures 33 for passage of vaporized nitrogen from inner vessel 11 into conduit 27. The apertures are preferably arranged in longitudinal rows spaced at uniform intervals around the outer periphery of the conduit. Similarly as illustrated in detail in FIGS. 2 and 3, apertures 34 are provided in longitudinal rows which are equally spaced around the outer periphery of end portion 30 received in bovine semen storage container 22a. The lower extremity 35 of end portion 30 is sealed and then positioned so as to abut against the top turface of canister support 36 for greater stability. The apertures nearest lower extremity 35 are preferably spaced at least 9 inches from the extremity when the container has a liquid nitrogen capacity of about 25 liters and a height about the same as its diameter. The reason for this spacing is that the vapor entering the bovine semen storage container 22a from conduit 27 through apertures 34 tends to descend to the bottom of the container, so that if the conduit end portion were perforated along its entire length, there would be an excessive amount of colder vapor at the lower end of the bovine semen-holding canisters. In this event, a uniform cooling rate would not be obtained for all of the semen specimens in container 22a.

In addition to cooling and freezing of biologicals in a highly efficient manner, the present apparatus is desirably portable and thus capable of employment at widely scattered locations. One embodiment of the invention comprises a U-shaped vapor transfer conduit 27 having first end portion 29 and second end portion 30 arranged and formed so as to be substantially parallel to each other with a connecting section therebetween. Each end portion has an annular plug 22 and 32 member longitudinally positioned around the outer periphery of the portion to seal against the mouths of the liquid refrigerant storage container 10 and the biological storage container 22a. Thermal insulation 28 is contiguously associated with the outer periphery of the vapor transfer conduit 27 between the first and second annular plugs.

Referring now to FIG. 4, the bovine-semen holding canisters 37 preferred for use with the apparatus of the present invention comprise a semi-circular tubular member 38 supported at the bottom by a cap 39 and at the top by ring 40. The semen-containing ampules comprise small glass or plastic vials 41 positioned within the canister by vertically aligned metal strips 42 having suitable seating means such as rings 43 extending horizontally from the strips at uniform intervals along the length thereof. The canisters may be constructed of any suitable material as long as the material can support the ampules 41 at low temperatures. The cap 39 preferably contains a layer 44 of insulating material such as the thermosetting phenol formaldehyde resin known commercially as Micarta. The reason for the insulating layer 44 is that the bovine semen-containing ampules are cooled at an excessively fast rate if the metal section of base 39 is allowed to directly contact the metal support 36. Alternatively the insulating layer 44 may be positioned on the canister support 36. For a 25-liter container whose diameter is approximately equal to its height, suitable canisters may for example be about 11½ inches in height and 2¾ inches in diameter.

Any canister configuration such as that previously described which will provide cooling and freezing of the semen in all of the ampules will be suitable for practicing the invention. To aid in this uniform distribution of the nitrogen vapor, it has been found that the canisters should be open not only from the top, but also from the side contiguous to the inner walls of vessel 23. To this end, the open side of the semi-circular tubular member 38 is preferably oriented contiguously with the vessel 23 inner wall. In this manner, the nitrogen vapor tends to be uniformly dispersed across the container 22a before contacting the ampules 41 and hence will be evenly distributed around the ampules. Any desired number of canisters 37 may be concentrically positioned around the conduit end portion 30 on the support 36.

In order to insure effective use of the combination of apertures 34 and the canister configuration, the apertures 34 should always be opened to the space between contiguous canisters so that the nitrogen vapor may freely circulate around the periphery of inner vessel 23. Therefore it is preferable to secure suitable indexing means such as horizontal partitions 44a at uniform intervals around the perimeter of canister support base 36.

As a further aid for the substantially uniform cooling of all of the ampules, it has been found preferable in the present apparatus that the diameter of the bovine semen storage container should be substantially equal to the height of such container.

In a preferred embodiment, the liquid nitrogen refrigerant container 10 and the bovine semen container 22a both have liquid nitrogen capacities of about 25 liters, and the heaters 15 and 16 have outputs of about 380 watts and 240 watts at 115 volts, respectively, to insure a proper amount of vaporization of the liquid refrigerant. Conduit 27 has an inside diameter of about 1.245 inches, and the conduit end portion 29 within the liquid nitrogen container is provided with twelve circular apertures 33 of about ⅜-inch diameter arranged in three horizontal and four longitudinal equally spaced rows around the conduit periphery. Also, the conduit end portion 30 enclosed in the bovine semen container 22a is provided with twenty-four circular apertures of about ¼-inch diameter arranged in four horizontal and six longitudinal rows each having an equal number of apertures. Apertures in each longitudinal row are about 1-inch apart center-to-center, the bottom or lowest apertures 45 are about 9 inches from the extremity of the conduit end portion as previously discussed, and the uppermost apertures 46 are about 13 inches above such extremity (see FIG. 2). Apertures in each horizontal row are about 0.7 inch apart, center-to-center.

Using apparatus as previously described and illustrated in the drawings, the rate of output of the 380 and 240 watt heaters needed to follow the FIG. 5 curve is as follows, assuming that the bovine semen has previously been chilled down to a temperature of +5° C., and placed in container 22a which has also been cooled to +5° C. Using liquid nitrogen as the refrigerant, the heater output will be 620 watts for 1 minute, 380 watts for 9 minutes, 620 watts for 5 minutes, and then 380 watts for the remaining 15 minutes.

If the bovine semen at +5° C. is placed in container 22a that has not been prechilled to +5° C. but is at room temperature, the output of the heaters should be 620 watts for 2 minutes, 380 watts for 8 minutes, 620 watts for 5 minutes, and then 380 watts for the remaining 15 minutes.

By employing the FIG. 1 apparatus and following the cooling curve of FIG. 5, a total of 504 bovine semen ampules were successfully frozen in situ by nitrogen refrigeration in a 25-liter container. The vitality was higher than that obtained by prior art systems.

Although preferred embodiments of the invention have been described in detail, it is contemplated that modifications of the apparatus may be made and that some features may be employed without others, all within the spirit and scope of the invention. For example, instead of employing coil-type heaters, plate-type heaters could be used.

To practice the method of this invention with the FIG. 1 apparatus, timer 17 is placed in operation with a predetermined heating program. The heaters 15 and 16 vaporize the liquid nitrogen refrigerant in inner vessel 11. The vaporized portion enters conduit 27 through apertures 33 and flows to the bovine semen container 22 for emergence through apertures 34. The cold nitrogen vapor circulates around the canisters 37 and cools and freezes the semen in all of the ampules 41 at substantially the same controlled rate. The warmed vapor rising to the top of container 22a is then preferably vented through grooves 32a in plug 32 to the atmosphere.

After a predetermined lower temperature has been reached (e.f. 50° C. for bovine semen), a low boiling liquefied gas such as liquid nitrogen can be supplied to the biological container without damage to the biologicals.

What is claimed is:

1. A method for cooling and freezing biological substance in a predetermined manner by heat exchange with a vaporized liquefied gas comprising the steps of providing said biological substance in a storage zone; providing a liquefied gas body having a boiling point below about −183° C. at atmospheric pressure; vaporizing a portion of said liquefied gas body independently of the temperatures of said biological substance and said storage zone at an adjustable rate; and uniformly distributing such vapor in said storage zone in heat exchange with said biological substance so as to uniformly cool and freeze said biological substance in said predetermined manner.

2. A method according to claim 1 in which said liquefied gas is nitrogen.

3. A method according to claim 1 in which said biological substance is bovine semen.

4. A method according to claim 1 in which said portion of said liquefied gas body is vaporized by heating said liquefied gas body.

5. A method according to claim 1 in which said liquefied gas is nitrogen, said biological substance is bovine semen, and said portion of said liquefied gas body is vaporized by heating said liquefied gas body.

6. A method according to claim 1 in which said biological substance is bovine semen which is cooled and frozen at a rate of between about 1° and 2° C. per minute in the temperature range of about +5° C. to −15° C. and at a rate of between about 3° and 5° C. per minute in the temperature range of about −15° C. to −50° C.

7. A method according to claim 1 including the step of filling said storage zone with liquefied gas subsequent to cooling and freezing said biological substance in said predetermined manner.

8. Apparatus for cooling and freezing biological substance in a predetermined manner by heat exchange with a vaporized liquefied gas comprising in combination, storage means for said biological substance; a vessel containing a liquefied gas body having a boiling point below about −183° C. at atmospheric pressure; means for vaporizing a portion of said liquefied gas body independently of the temperatures of said biological substance and said storage means at an adjustable rate; and means for uniformly distributing such vapor in said storage means in heat exchange with said biological substance so as to uniformly cool and freeze said biological substance in said predetermined manner.

9. Apparatus according to claim 8 including means for filling said storage means with liquefied gas subsequent to cooling and freezing said biological substance in said predetermined manner.

10. Apparatus according to claim 8 in which said means for vaporizing a portion of said liquefied gas body comprises at least one electrical heater immersed in said liquefied gas body.

11. Apparatus according to claim 8 in which said means for vaporizing a portion of said liquefied gas comprises an adjustable timer.

12. Apparatus for cooling and freezing biological substance in a predetermined manner by heat exchange with a vaporized liquefied gas comprising in combination a first container for said biological substance; a second container storing a liquefied gas body having a boiling point below about −183° C. at atmospheric pressure; means for vaporizing a portion of said liquefied gas body independently of the temperatures of said biological substance and said first container at an adjustable rate, such means comprising at least one heater immersed in said liquefied gas body; and means for uniformly distributing such vapor in said first container in heat exchange with said biological substance so as to uniformly cool and freeze said biological substance in said predetermined manner, such means including a conduit having closed extremities and having opposite end portions enclosed in said first and second containers, respectively, and provided with longitudinally-spaced apertures for passage of said vapor through said conduit from said second container to said first container.

13. Apparatus according to claim 12 including a plurality of canister means for supporting said biological substance in said first container; and in which the apertures in the conduit end portion enclosed in said first container are directed between the canister means.

14. Apparatus for cooling and freezing biological substance in a predetermined manner by heat exchange with a vaporized liquefied gas comprising in combination a first container for said biological substance; a second container storing a liquefied gas body having a boiling point below about −183° C. at atmospheric pressure; means for vaporizing a portion of said liquefied gas body independently of the temperatures of said biological substance and said first container at an adjustable rate, such means comprising at least two separately operable heaters immersed in said liquefied gas body; and means for uniformly distributing such vapor in said first container in heat exchange with said biological substance so as to uniformly cool and freeze said biological substance in said predetermined manner, such means including a conduit having closed extremities and having opposite end portions enclosed in said first and second containers, respectively, and provided with longitudinally-spaced apertures for passage of said vapor through said conduit from said second container to said first container.

15. Apparatus according to claim 14 in which said means for vaporizing a portion of said liquefied gas includes an adjustable timer arranged and constructed for separately and jointly operating the heaters for variable succeeding periods.

16. Apparatus according to claim 12 in which said apertures in the conduit end portion within said first container are arranged in longitudinal rows along such portion, the rows being horizontally spaced at uniform intervals around the outer periphery of said conduit.

17. Apparatus according to claim 12 in which the height and diameter of said first container are about equal.

18. Apparatus for controlled cooling and freezing of bovine semen comprising a first thermally insulated container for storing said bovine semen and having about the same diameter and height; a second thermally insulated container storing liquid nitrogen; at least two electrical heaters immersed in said liquid nitrogen and an adjustable timer arranged and constructed for separately and jointly operating said heaters for variable succeeding periods so as to controllably heat said liquid nitrogen and vaporize a portion thereof; a conduit having opposite end portions enclosed respectively in said first and second containers for transferring the vaporized portion from said second container to said first container to cool and freeze said bovine semen, the extremities of said conduit being closed and the end portions being provided with spaced apertures for passage of said vaporized portion into said conduit from said second container and discharge therefrom to said first container, said apertures in the conduit end portion within said first container being arranged and constructed in longitudinal rows along such portion, the rows being horizontally spaced at uniform intervals around the outer periphery of said conduit.

19. Apparatus according to claim 18 in which said two electrical heaters have outputs of 380 and 240 watts, the first container has a liquid nitrogen capacity of 25 liters, and the conduit end portion enclosed in said first container is provided with twenty-four apertures of about ¼ inch diameter arranged in six longitudinal rows each having an equal number of apertures, contiguous apertures in each row being about 1⅛-inch apart, the lowermost apertures being about 9 inches from the extremity of said conduit end portion and the uppermost apertures being about 13 inches from said extremity.

20. Apparatus for controlled cooling and freezing of biological substances comprising a vapor transfer conduit having first and second end portions arranged and formed so as to be substantially parallel to each other with a connecting section therebetween, the extremities of said end portions opposite said connecting section being sealed, multiple apertures being provided along such end portions; an electric heater attached to the first end portion extremity; a first annular plug member longitudinally positioned around the outer periphery of the first end portion to seal such portion within the mouth of a liquid refrigerant storage container; a second annular plug member longitudinally positioned around the outer periphery of the second end portion to seal such portion within the mouth of a biological storage container; controller means affixed to said vapor transfer conduit and electric connecting means between said controller means and said heater for actuating the heater to produce desired refrigerant vaporization rate; and thermal insulation contiguously associated with the outer periphery of said vapor transfer conduit between said first and second annular plugs.

References Cited in the file of this patent
UNITED STATES PATENTS

| | | |
|---|---|---|
| 2,279,705 | Dayhuff | Apr. 14, 1942 |
| 2,479,840 | Johnson et al. | Aug. 23, 1949 |
| 2,479,866 | Rosebaugh | Aug. 23, 1949 |
| 2,479,867 | Rosebaugh | Aug. 23, 1949 |
| 2,831,329 | Morrison | Apr. 22, 1958 |
| 2,951,351 | Snelling | Sept. 6, 1960 |